United States Patent [19]

Whitcomb

[11] Patent Number: 4,500,601
[45] Date of Patent: Feb. 19, 1985

[54] CHELATING POLYMERS FOR MODIFYING METAL SURFACE PROPERTIES

[75] Inventor: David R. Whitcomb, Maplewood, Minn.

[73] Assignee: Minnesota Mining and Manufacturing Company, St. Paul, Minn.

[21] Appl. No.: 527,332

[22] Filed: Aug. 29, 1983

[51] Int. Cl.³ .................. B32B 15/08; B32B 27/14
[52] U.S. Cl. ................... 428/403; 428/461; 528/392
[58] Field of Search ........ 428/476.9, 403, 461; 528/392; 524/431; 106/252; 252/182; 204/212

[56] References Cited

U.S. PATENT DOCUMENTS

| | | | |
|---|---|---|---|
| 2,634,253 | 4/1953 | Maynard | 528/392 |
| 3,165,487 | 1/1965 | Gardner et al. | 524/431 |
| 3,304,276 | 2/1967 | Faulkner et al. | 106/252 |
| 3,395,134 | 7/1968 | d'Alelio | 204/212 |
| 4,086,182 | 4/1978 | Hengelhaupt et al. | 252/182 |

OTHER PUBLICATIONS

L. I. Aristov et al., *Chem. Abstracts*, vol. 71, 30337.
D. Braun and H. Boudevska, *Eur. Polym. J.*, vol. 12, 525, (1976).
G. V. Dalipagich et al., *Chem. Abstracts*, vol. 79, 80424k.
R. N. Faulkner, *J. Oil Colour Chem. Assoc.*, vol. 50, pp. 524–544, (1967).
B. N. Kal'yan et al., *Chem. Abstracts*, vol. 79, 80423j.
E. Knowles and T. White, *Adhesives and Resins*, 2, pp. 255, 257–258, Nov. 1954.
K. Kojima et al., (1), *Chem. Abstracts*, vol. 82, 17554.
K. Kojima et al. (2), *Chem. Abstracts*, vol. 83, 131987.
V. Laurinavicius et al., *Chem. Abstracts*, vol. 88, 106055.
R. Paton et al., *Aust. J. Chem.*, vol. 27, 1185 (1974).
O. Vogl et al., (1), *J. Poly. Sci. Polym. Chem. Ed.*, vol. 14, 2725 (1976).
O. Vogl et al. (2), *J. Poly. Sci. Polym. Chem. Ed.*, vol. 18 2755 (1980).
A. Winston et al., (1), *J. Polym. Sci. Chem. Ed.*, vol. 13 2019 (1975).
A. Winston et al. (2), *J. Polym. Sci. Chem. Ed.*, vol. 14, 2155 (1976).
E. V. Zobov et al., *Chem. Abstracts*, vol. 79, 93534w.
Abstract of Japanese 77148599, 5–1976, Kokai.
Abstract of Japanese 77148600, 5–1976, Kokai.
Abstract of Japanese 77152934, 6–1976, Kokai.
Abstract of Japanese 78005238, 7–1976, Kokai.
Abstract of Japanese 78022598, 8–1976, Kokai
Abstract of Japanese 78023399, 8–1976, Kokai.
Abstract of Japanese 78102400, 5–1976, Kokai.
Abstract of Japanese 80040711, 9–1978.
J. F. Kennedy et al., *J. Chem. Soc. Perkin I*, pp. 488–490, 1973.
K. Idel et al., *Makromol. Chem.* 177, pp. 2927–2943, Jan. 1976.

*Primary Examiner*—Thomas J. Herbert
*Attorney, Agent, or Firm*—Donald M. Sell; James A. Smith; Lorraine R. Sherman

[57] ABSTRACT

A composite structure and method therefor comprises a metal surface which is coated with a polymer incorporating a bidentate chelating functionality. The polymer provides significant and varied chemical modification to the metal surface and is useful, for example, as a protective coating or a priming layer. Bidentate chelating monomers useful in preparing homopolymers and copolymers with ethylenically-unsaturated non-chelating monomers have structures described by the formula

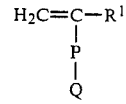

in which $R^1$ is hydrogen, lower alkyl, chlorinated lower alkyl, CN, or Cl P is a connecting linkage of chain length up to to about 75 atoms, and Q is a bidentate chelating group having a high affinity for the ions of the metal of the surface involved.

13 Claims, No Drawings

CHELATING POLYMERS FOR MODIFYING METAL SURFACE PROPERTIES

TECHNICAL FIELD

The present invention relates to a composite structure and method therefor in which a metal surface is coated with a polymer incorporating a bidentate chelating functionality. The polymer provides significant and varied chemical modification to the metal surface and is useful, for example, as a protective coating or a priming layer.

BACKGROUND ART

Chelating agents are well known and are regarded in the art as compounds which contain two or more donor atoms selected from oxygen, nitrogen, and sulphur positioned so that they may react with a metal ion to form a five- or six-membered ring. The donor atoms may be of the same or different elements selected from the above group. Chelating agents having two or more atoms which can serve as donors are referred to as bidentate or polydentate groups. Oxygen-containing donor groups include alcohols, enols, phenols, ethers, carboxylic acids, and carbonyl groups, as in, for example, aldehydes, ketones, carboxylic esters, and carboxamides. Nitrogen-containing donor groups include imines and amines (primary, secondary and tertiary), including imines and amines in which the nitrogen atom forms part of a heterocyclic ring. Examples of sulphur-containing donor groups are thiols, thiophenols, thioethers, and thiocarbonyls, as in, for example, thioacids, thioesters, and thioamides, including groups in which the sulfur atom is part of a heterocyclic ring. Chelating agents, on reaction with many metal ions, form highly stable five- or six-membered rings.

Polymers containing chelating groups that react with metal surfaces are of interest in the present application. U.S. Pat. No. 3,395,134 discloses that

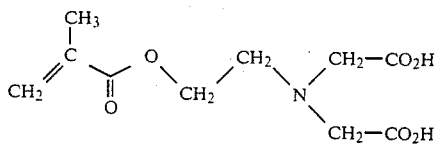

and related compounds, when copolymerized with methyl methacrylate to an incorporation of greater than 0.1 percent, impart much improved adhesion to steel. The synthesis of this compound has proved impossible to reproduce, which may be related to the fact that it is a zwitterionic chelating agent. It differs from chelating agents of the present invention in that it is a tridentate chelating agent.

Tannins have been incorporated in phenol-formaldehyde resins for use as anti-corrosion primers, as disclosed in E. Knowles and T. White, *Adhesives and Resins*, 2, 255 (1954) and G. Stephan, *Farbe Lack*, 68, 701–5, 777–84, (1962). G. B. Patent Specification No. 1,230,220 relates to corrosion-preventing paints, which contain related chelating agents (i.e. polyhydroxy phenols) condensed with formaldehyde and cashew nut shell liquid. In these polymers, the chelating groups are not pendent to the main chain, as are required in the present invention.

Chelating groups have been incorporated into epoxy resins for adhesion to metal surfaces as disclosed in Japan Kokai 77-148,599, 77-148,600, 77-152,934, 78-05,238, 78-22,598, 78-23,399, 78-102,400; Japan Tokkyo Koho 78-46,582 and B. N. Kal'yan et al. *Tr. Kishinev Politerkh Inst.* 97, (1971), G. V. Dalipagich et al. Ibid, 105, (1971), and E. V. Zobov et al. Ibid, 86, (1971). These polymeric resins which cross-link upon curing to three-dimensional structures are entirely different from the linear polymers of the present invention.

U.S. Pat. No. 3,304,276 teaches the modification of alkyd resins and drying oils so as to include polyhydric phenol groups (e.g., gallate) or acetoacetate groups. When applied to steel surfaces, they leach out Fe(III) ions, forming intermolecular chelate complexes. In R. N. Faulkner, *J. Oil Colour Chem. Assoc.* 50, 524–44 (1967), it is suggested that the good adhesion sometimes observed in these systems may result from coordination of gallate groups to metal ions without removal of the latter from the surface. These coatings contain oxygen in their backbone structures. Further, there is no teaching as to what materials and conditions would promote adhesion of resins to metal surfaces.

A mixture of chelating and non-chelating polymers as an anti-corrosion agent for iron or steel is disclosed in U.S. Pat. No. 4,086,182. The chelating polymers have, in addition to pendent chelating groups, pendent free acid groups on a hydrocarbon backbone.

U.S. Pat. No. 3,165,487 teaches a graft terpolymer of styrene-butadiene copolymer and a chelating alkali salt of vinylphenyl alpha-aminocarboxylic acid for which good adhesion to steel is claimed. This graft copolymer is unrelated to the random copolymers of the present invention.

U.S. Pat. No. 2,634,253 relates to the nitrile groups of a butadiene/methacrylonitrile/styrene terpolymer (10:2:1) which were reduced to amine groups and condensed with salicylaldehyde to give pendant Schiff-base groups. These chelating polymers extract metal ions from solution to give insoluble chelates which are in contrast to the polymers of the present invention which are soluble in many common organic solvents and are useful as layers coated on metal surfaces.

J. F. Kennedy, et al., *J. Chem. Soc. Perkin I*, 488 (1973) discloses homopolymers of 4- and 5-acrylamidosalicylic acid which have been used for selective binding of enzymes and proteins. Ger. Offen. No. 2,848,967 and Ger. Offen. No. 2,849,112 disclose salicylaldehyde derivatives, along with the corresponding Schiff bases obtained by condensation with amines, form homopolymers and copolymers (1–99 percent) with conventional monomers, with uses for molded articles, high-impact materials, coatings, adhesives, and treatments for paper and textiles.

Japan Kokai 80-40,711 teaches polymers containing pendant acetoacetate groups which are chelating groups for use as coatings on paper, fiber, and fabrics. These are either block copolymer systems or are cross-linked systems and additionally differ from the present invention in that no mention is made of their use on metal surfaces.

Chelating monomers are known in the art. Derivatives of salicylic acid have been disclosed by J. F. Kennedy et al. *J. Chem. Soc. Perkin I*, 488 (1973), O. Vogl et al. *J. Poly. Sci. Polym. Chem. Ed.* 14 2725 (1976), Ibid 18 2755 (1980), and D. Braun and H. Boudevska, *Eur. Polym. J.* 12, 525 (1976). Derivatives of 8-hydroxyquinoline are taught by V. Laurinavicius et al. *Chem. Abs.* 88, 106055, L. I. Aristov et al. *Chem. Abs.*, 62, 7722h, Ibid 71, 30337, K. Idel et al. *Makromol*

*Chem.* 177, 2927 (1976), Ger. Offen. 2,407,306, and Ger. Offen. 2,407,307. Salicylaldehyde derivatives and salicylidene amine derivatives are disclosed in German Offen. No. 2,848,967 and German Offen. No. 2,849,112 respectively. Additional chelating monomers are disclosed in K. Kojima et al. *Chem. Abs.* 79, 87236, K. Kojima et al. *Chem. Abs.* 82, 17554, and K. Kojima et al. *Chem. Abs.* 83, 131987.

Polymers with chelating pendant hydroxamic acid groups or picolinic acid groups are disclosed in A. Winston et al. *J. Polym. Sci. Polym. Chem. Ed.* 13, 2019, (1975), Ibid 14, 2155 (*1976*), Ibid 11, 597 (1978), and R. Paton et al. *Aust. J. Chem.* 27, 1185 (1974).

SUMMARY OF THE INVENTION

The present invention provides linear, film-forming polymers or copolymers coated on certain metal surfaces, which polymers or copolymers are derived from one or more types of ethylenically-unsaturated monomers, at least one of which has bidentate chelating moieties, and constitutes between 0.01 and 100 mole percent of the monomer units and preferably between 3 and 20 mole percent of the monomer units. The bidentate chelating monomers have structures described by the formula

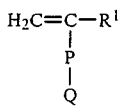

I in which $R^1$ is hydrogen, lower alkyl (1 to 4 carbon atoms), CN, or Cl

P is a connecting linkage of chain length up to about 75 atoms, and

Q is a bidentate chelating group having a high affinity for the ions of the metal of the surface involved.

The polymers and copolymers of the present invention are film-forming and are highly adherent to metal surfaces, particularly such metals as Al, Mg, Zn, Fe, Cu, and their alloys. When coating on a metal surface, the polymeric coating provides a method of altering the properties of a metal surface in respect to corrosion, hydrophilicity and hydrophobicity, susceptibility to mechanical damage, light reflectance, color and are capable of conferring controlled adhesion properties at the free surface of the polymer layer.

The polymers and copolymers of the present invention have linear, hydrocarbon backbones, which may be substituted by halogen or cyano moieties, and pendent bidentate chelating groups attached thereto. There are no oxygen atoms within the backbone structure and no cross-links between the linear chains. The novel linear polymers and copolymers which have pendent bidentate chelating groups are of the non-graft and non-block type. It is not advantageous in the present invention to have a high concentration of chelating groups in the polymeric structure since such a polymer tends to sequester metal ions out of the metal surface and be non-adherent thereto.

The choice of the chelating group Q is base upon its chelating ability as defined in the following way which will include most known bidentate chelating groups. For bidentate chelating moieties their chelating ability is such that the first step-wise stability constant $K_1$ (defined below) with the metal is greater than or equal to $10^7$, and whose chelating ability is less than that required for dissolution of metal ions from the metal surface.

The coatings of the present invention can be homopolymers of the bidentate chelating monomers, defined above or they can be copolymerized with ethylenically-unsaturated non-chelating monomers chosen to give to the resulting copolymer the properties required for suitable application to the metal surface and the properties suitable to the intended use of the treated metal surface. Thus, although homopolymers of the chelating monomers are useful, copolymers prepared from chelating and non-chelating monomers, or mixtures thereof, are generally more useful because of the extra dimension provided in the choice of the effect on the surface properties of the metal, and in the choice of application conditions of the polymer to the metal surface.

As used in the present invention:

"backbone" means the main chain or spine of the polymer, exclusive of linking and end-capping groups;

"chelating polymer" means any polymer in which from 0.01 to 100 percent of the repeat units have attached to them a pendent bidentate chelating group. The concentration of chelating groups and the identity of the co-monomers may be selected not only to provide good adhesion to the metal surface but also to provide maximum interaction with a subsequently applied topcoat. Alternatively, they may be selected to repel surface contaminants;

"copolymer" means any polymer having a structural arrangement of two or more different monomers in random sequence; and "alloy" means a mixture of a metal with one or more other metal or non-metallic elements such as nickel, chromium, copper, and carbon (e.g., brass, bronze, chrome-nickels, steels, carbon steel);

"lower alkyl" means an alkyl group having 1 to 4 carbon atoms; and

"inert solvent" means an organic or inorganic solvent that is unreactive with the chelating group of a polymer.

The film-forming polymers and copolymers of the present invention have pendent bidentate chelating groups. They are linear polymers which are not cross-linked. Hence, epoxy materials which promote oxygen-containing crosslinking bridges are not included in the present invention. The present invention relates to homopolymers and random copolymers. Graft copolymers and physical mixtures of chelating and non-chelating polymers have disadvantages in their physical properties, the former having high chelating strength which tends to promote the sequestering (solvation) of metal ions from the surface and is deleterious to adhesion, whereas the latter leads to variable and inconsistent adhesive properties.

The present invention teaches the value of bidentate chelating moieties in its film-forming polymers because of their moderate chelating strength. It is important that the chelating strength be within the correct range. If it is too low, little more adhesion to the metal surface occurs than with a simple hydrocarbon polymer; if it is too high metal atoms are pulled from the surface to make a permanent complex with the chelate. Tridentate and higher chelates are generally unsuitable because of solvation of the metal surface.

Thus, the bidentate chelate-containing polymers of this invention are surprisingly tolerant of the choice of chelate moiety, of the molar ratio of that moiety to the other monomer moieties, and of the choice of the other ethylenically-unsaturated monomers. This provides wide freedom in the selection of polymers to suit the metal surface, and at the same time a wide range in the intended use of the treated surface, with latitude remaining in the application conditions for the polymers to the metal.

DETAILED DESCRIPTION

The composite structure of the present invention comprises a metal surface, preferably the surface comprising metal atoms and ions selected from (1) the transition metals and (2) the metals of Groups IIA, IIIA, and IVA of the Periodic Table or alloys thereof, and applied thereto a linear, film-forming polymer or random copolymer having a hydrocarbon backbone, said polymer or copolymer being derived from at least one ethylenically-unsaturated monofunctional monomer, at least one of which monomers contribute to the polymer or copolymer pendent bidentate chelating groups whose chelating ability is less than that required for dissolution of metal ions from said metal surface.

The metal surface bears an organic polymeric coating, the bidentate chelating group of which forms a complex compound with the metal, said polymeric coating comprising:

(1) 0.01 to 100 mole percent, and preferably 3 to 20 mole percent of at least one chelating monomer unit selected from units having the formula

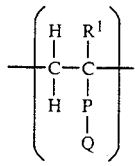

in which $R^1$ is hydrogen, lower alkyl, chlorinated lower alkyl, CN, or Cl;

P is a connecting linkage of 1 to 6 moieties selected from the group consisting of a single bond, —O—, —S—,

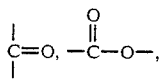

—SO$_2$—, a methylene chain up to 22 carbon atoms long optionally substituted with up to 11 lower alkyl groups, —NR$^2$— wherein R$^2$ is H or lower alkyl,

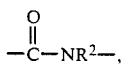

—SiR$^2$R$^3$— wherein R$^3$ is H or lower alkyl independently of R$^2$, phenylene, phenylene substituted with lower alkyl, naphthylene, naphthylene substituted with lower alkyl, 5- or 6-membered heterocyclic rings containing up to 3 hetero atoms selected from N, S, O, and a combination of any such groups, providing the total length of connecting linkage P is not more than 75 atoms and providing that P does not react with Q, nor enter into any chelating action with Q, nor has polymerizing units within it; and Q is bidentate chelating moiety chosen from groups having a high affinity for the polyvalent metal ion defined above, this high affinity being defined, for bidentate chelating moieties, by a first step-wise stability constant as follows:

$K_1$ should be greater than or equal to $10^7$ where $$K_1 = \frac{[M^{n+}Q]}{[M^{n+}][Q]}$$

in which $M^{n+}$ is the ionized metal involved, Q is the bidentate chelate moiety, and $M^{n+}Q$ is the first-formed complex, and the solvating ability of the bidentate group for the metal surface being given by the expression $$\log K_1 + n(14-pH) - (pK_s + pK_a)$$

is algebraically less than 0.0 wherein:

$K_1$ is the first stepwise stability constant of the chelate and metal, n is the relevant valency of the metal, pH if the acidity relevant under the conditions of test, $pK_s$ is the solubility product of the metal hydroxide, and $pK_a$ is the stability constant of H$^+$ with the chelate moiety, (Values of these parameters may be obtained by measurement or from standard reference texts such as "Stability Constants, Supplement No. 1."-Special Publication 25 of the Chemical Society, edited by A. E. Martell and L. G. Sillen, 1971); and (2) 99.99 to 0 mole percent, and preferably 97 to 80 mole percent of units derived from copolymerizable ethylenically-unsaturated monomers, which monomers provide hydrocarbon backbones, optionally substituted by fluorocarbon-containing moieties, to the resulting copolymer.

The molecular weight of polymers and copolymers is in the range of 5,000 to 1,000,000, with the number of individual monomer units present being in the range of 50 to 10,000.

The definition of Q will include such groups as the following:

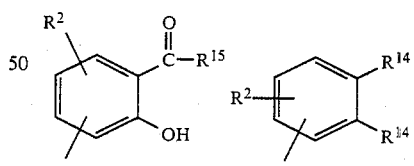

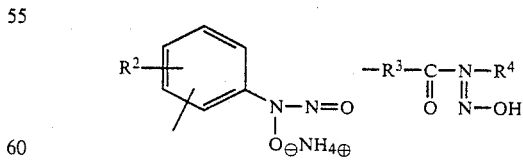

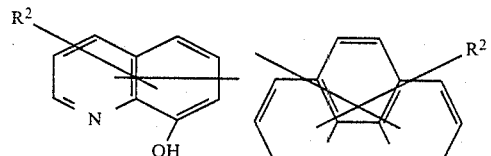

-continued

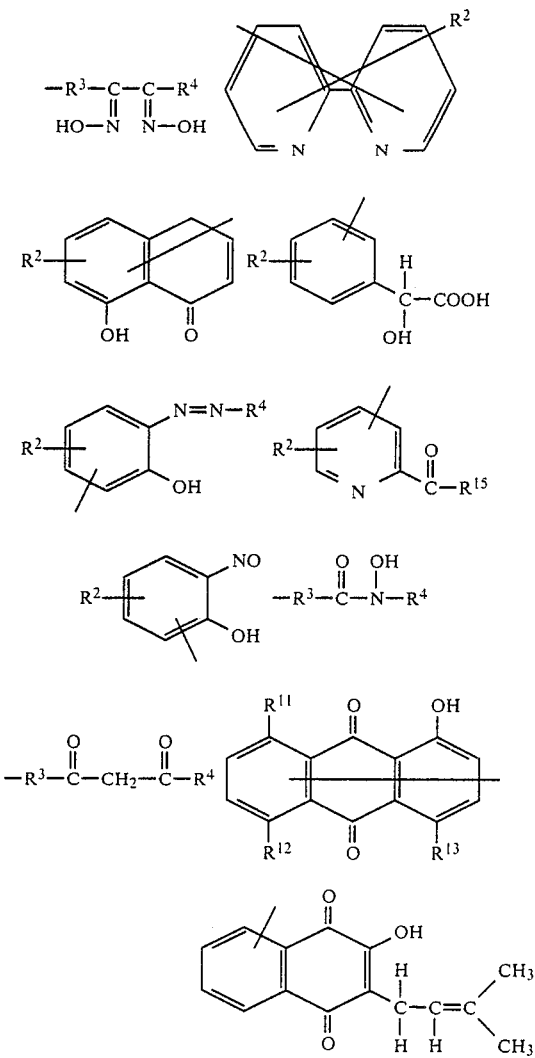

wherein:

$R^2$ is hydrogen, halogen (F, Cl, Br, I), —$NO_2$, —OH, —COOH or alkyl groups having 1 to 12 carbon atoms, or phenyl or naphthyl optionally substituted by one or more methyl or ethyl groups for a total of 6 to 12 carbon atoms;

$R^3$ is an unsubstituted alkylene or arylene (i.e., phenylene or naphthalene) group or these groups substituted by one or more methyl or ethyl groups, $R^3$ having up to 12 carbon atoms;

$R^4$ is an unsubstituted alkyl or aryl (i.e., phenyl or naphthyl) group or these groups substituted by one or more methyl or ethyl groups, $R^4$ having up to 12 carbon atoms;

$R^{11}$ is hydrogen or —OH;

$R^{12}$ and $R^{13}$ independently are hydrogen, —OH or —$NO_2$;

$R^{14}$ is independently selected from —OH, —SH, —$NH_2$, or

$R^{15}$ is —H, —OH, alkoxy having 1 to 6 carbon atoms, or —$O^{\theta}$ with a cation such as Na+ or $NH_4$+;

but the definition of Q excludes chelating groups possessing zwitterionic character. Suitable units of this invention are obtained from chelating monomers which include: salicylic acids such as 5-nitro-4-methacrylamidosalicylic acid, 5-chloro-4-methacrylamidomethylsalicylate, 2-hydroxy-4-vinylbenzoic acid, or 4-methacrylamidosalicylate; benzenes, such as 1,2-dihydroxy-5-chloro-3-phenylmethacrylate, 1,2-dithio-5-bromo-3-phenyl-thiomethacrylate, 2-thio-5-methacryloyloxybenzoic acid, and 2-amino-5-methacryloyloxyphenol; quinolines, such as 4-nitro-5-methacryloyloxy-8-hydroxy-quinoline and 4-hydroxy-5-methacryloloxy-8-hydroxyquinoline; 2,2'-bipyridines and 2,2'-biquinolines, such as 7-iodo-8-acryloyloxybiquinoline; hydroxamic acids, such as N-benzyl-N-hydroxymethacrylamide and 4-vinylbenzohydroxamic acid; azophenols, such as 2-azophenyl-3-methacrylamidophenol and 2-azostyrylphenol; 1,3 diketones such as 1-(p-styryl)-2,4-pentanedione; 1,10 phenanthrolines, such as 2-methyl-9-allylamino-1,10-phenanthroline and 2-carboxy-9-methacryloyloxy-1,10-phenanthroline; oximes, such as 4-methacryloyloxyphenylglyoxime and 3-trifluoromethyl-4-methacryloyloxyphenylglyoxime; carboxyquinolines, such as 2-carboxy-6-allyl-quinoline and 2-carboxy-3-nitro-6-acryloyloxyquinoline; acetic acids, such as 2-hydroxy-2-(4-methacryloyloxyphenyl)-acetic acid and 2-hydroxy-2-(4-methacrylamidophenyl)-acetic acid; anthraquinones, such as 1,8-dihydroxyanthraquinone; nitrosophenols, such as 4-(3-methacryloyloxydimethylsilyl)-2-nitrosophenol.

Novel bidentate chelating monomers and polymers derived therefrom having ethylenically-unsaturated moieties, disclosed in assignee's copending patent application U.S. Ser. No. 527,333, and filed the same date as this application, are useful in the present invention as homopolymers and as copolymers with non-chelating monomers. These novel bidentate chelating monomers belong to a class having the general formulae:

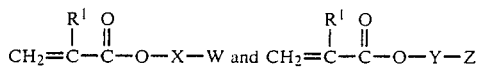

in which $R^1$ is H, lower alkyl, chlorinated lower alkyl, CN, or Cl;

X is a connecting linkage of 1 to 6 moieties selected from the group consisting of a single bond, —O—, —S—,

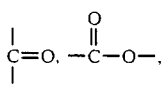

—$SO_2$—, a methylene chain up to 22 carbon atoms long optionally substituted with up to 11 lower alkyl ($C_1$ to $C_4$) groups, —$NR^2$— wherein $R^2$ is H or lower alkyl ($C_1$ to $C_4$),

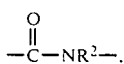

or —$SiR^2R^3$—, wherein $R^3$ is H or lower alkyl independently of $R^2$, phenylene, phenylene substituted with lower alkyl, naphthylene, naphthylene substituted with lower alkyl, 5- or 6-membered heterocyclic rings containing up to 3 hetero atoms selected from N, S, O, and a combination of any such groups, providing that the total length of connecting linkage X is not more than 75 atoms and providing that X does not react with W, nor enter into any chelating action with W, nor have polymerizing units within it; and W is a bidentate chelating moiety selected from the group consisting of (a)
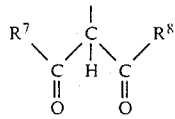

(b)
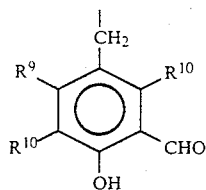

(c)
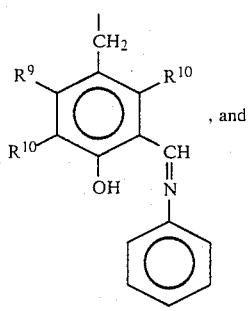

, and (d)
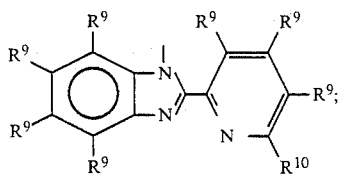

wherein $R^7$, $R^8$ are independently lower alkyl ($C_1$-$C_4$);

$R^9$ is independently selected from a hydrogen atom, a halogen atom selected from F, Cl, Br, and I, an $NO_2$ group, an alkyl group having 1 to 10 carbon atoms, an alkoxy group having 1 to 10 carbon atoms, an alkylthio group having 1 to 10 carbon atoms, a phenyl group, and a phenyl group substituted by up to 3 groups chosen from a halogen atom, an $NO_2$ group, and a lower alkyl group having 1 to 4 carbon atoms;

$R^{10}$ is independently selected from a hydrogen atom, a halogen atom selected from F, Cl, and Br, an $NO_2$ group, an alkyl group having 1 to 10 carbon atoms, an alkoxy group having 1 to 4 carbon atoms, an alkylthio group having 1 to 4 carbon atoms, and a phenyl group;

Y is a connecting linkage selected from a single bond and the group —$CH_2L$—, wherein L is 1 to 6 moieties selected from the group consisting of —O—, —S—,

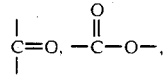

—$SO_2$—, a methylene chain up to 22 carbon atoms long optionally substituted with up to 7 lower alkyl ($C_1$ to $C_4$) groups, —$NR^2$— wherein $R^2$ is H or lower alkyl,

—$SiR^2R^3$— wherein $R^3$ is H or lower alkyl independently of $R^2$, phenylene, phenylene substituted with up to 4 lower alkyl ($C_1$ to $C_4$) groups, naphthylene, naphthylene substituted with up to 6 lower alkyl groups, 5- or 6-membered heterocyclic rings containing up to 3 hetero atoms selected from N, S, O, and a combination of any such groups, providing that the total length of connecting linkage Y is not more than 75 atoms and providing that Y does not react with Z, nor enter into any chelating action with Z, nor have polymerizing units within it;

Z is a bidentate chelating moiety selected from the group consisting of (e)
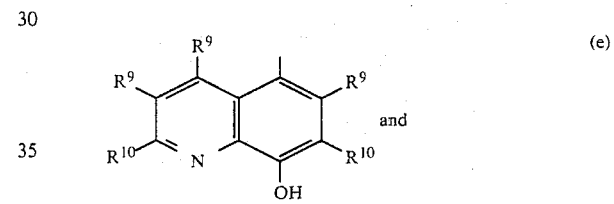

and (f)
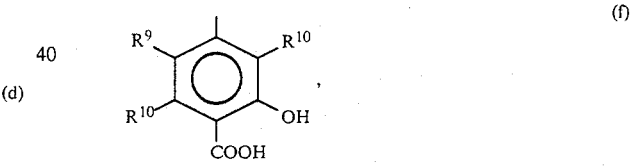

wherein $R^9$ and $R^{10}$ are as defined above.

Novel chelating monomers which are suitable for use in the invention and conform to Formula A include structures (1) to (6).

(1)
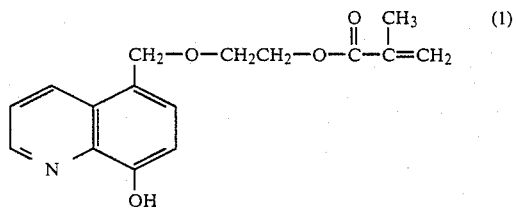

(2)
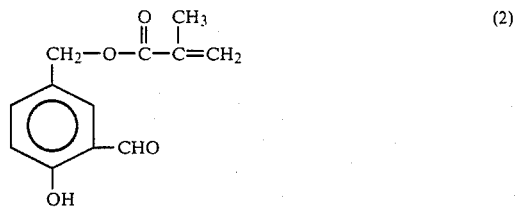

-continued

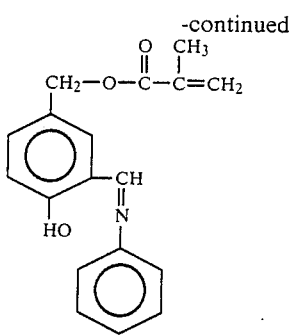 (3)

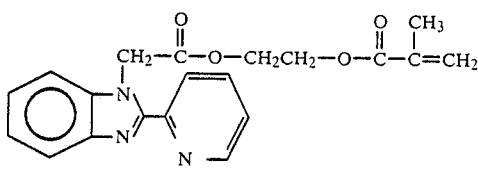 (4)

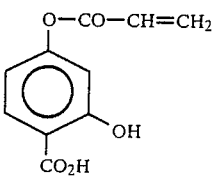 (5)

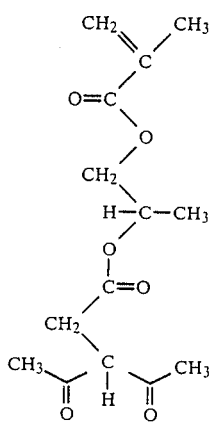 (6)

The metals with which these polymers can form strongly adhesive bonds are metals such as aluminum, magnesium, zinc, iron, copper, brass, etc. This group contains the transition metals of the Periodic Table and the metals of Groups IIA, IIIA, and IVA and alloys thereof. The metal may be self-supporting, a thin layer on a support, or in a finely divided particle form.

The non-chelating monomers which can be copolymerized with the chelating monomers may be selected from any conventional monomer having ethylenic unsaturation, such as ethylene and other olefins, acrylic acid and its esters, methacrylic acid and its esters; vinyl alcohol and its esters, styrene, dienes including butadiene, etc. The choice of these monomers depends on the properties required of the resulting copolymers. The inclusion of fluorocarbon substituents in the monomers can have advantageous effects on the surface properties as is well known in the art. A discussion of this range of monomers and their copolymerization properties may be found in "Textbook of Polymer Chemistry", F. W. Billmeyer, Interscience Publishers, Inc., NY 1957, Chap. 29, 30 and, "Monomers", E. R. Blout and H. Mark, Interscience Publishers, Inc., NY 1951, and "Copolymerization", T. Alfrey, Jr., J. J. Bohner, H. Mark, Interscience Publishers, Inc., NY 1964.

The copolymers are characterized in that they contain at least one non-chelating organic monomer such as vinyl or vinylidene monomers, e.g. methyl methacrylate, butyl acrylate, styrene (see for example the listing in U.S. Pat. No. 3,395,134, column 7, lines 60–75), and at least one pendent chelate monomer of the invention, such that the conventional organic monomers are incorporated in a total amount from 0 to 99.99 mole percent, preferably 80 to 97 mole percent, and the pendent chelate monomers in total amount of 0.01 to 100 mole percent, preferably 3 to 20 mole percent, of the polymer, and the nonchelating monomer and chelating monomer moieties are distributed randomly within the copolymer.

Copolymers of the invention are much preferred over homopolymers of the chelating monomers. These are random copolymers and do not include block copolymers.

By having chelating sites spaced apart within the polymer as is the case in a random copolymer, there is a reduced tendency to leach metal ions from any metal surface and adhesion is thereby improved. Homopolymers of the chelating monomers would be less likely to possess useful physical properties and, therefore, provide a more restricted choice for a particular application. By incorporating the chelating monomers at low levels in conventional polymers, the useful properties of the latter may be combined with improved adhesion. Generally, it is expectd that levels of incorporation of the chelating monomers within the copolymer of from 3 to 20 percent on a molar basis would be the most useful. The polymers as prepared do not contain metal ions.

While a variety of chelating groups may be incorporated in any polymer, it should be understood that only a limited range of chelating groups will be suitable for a given metal surface. Hence, it is necessary to select the chelating group(s) to be present in the polymer in order to attain the optimum properties for any particular application.

The polymers and copolymers of this invention can be prepared as is known in the art in mass, in solution, in suspension, and in emulsion systems, using the accepted initiating systems, such as by using the per compounds that generate radicals, or thermally, or with ultraviolet light, or with ionizing radiation, and in some cases, with ionic catalysts, both cationic and anionic, e.g., $BF_3$, sodium amide, HF, etc.

Coatings of the polymers were applied onto prepared metal surfaces from solutions or suspensions in suitable inert solvents known in the art such as acetone, chloroform, and water. Applications can also be made as a 100 percent solids formulation. A variety of coating techniques may be used giving dry coating thickness range of 1 to 100 micrometers, such as wire wound bars (Mayer or K-bars TM, R. K. Print-Coat Instruments, Ltd., England), knife coating, and flood coating, in which the preferred concentrations of polymers in solvent are in the range of 3 to 10 weight percent. Dip adsorption application to the metal surface (sometimes termed exhaustion coating) may be used in which case solution concentrations in the range 0.1 to 3.0 weight percent may be used. After immersion in the polymer solution in which the inert solvent is selected, for example, from those disclosed above for a predetermined time (e.g., one hour) the metal is removed, rinsed with plain solvent, and dried. This technique gives extremely thin coatings which are particularly valuable as priming layers. A variation of this technique provides for close control of the amount of polymer adsorbed to the metal surface and makes use of very low concentration solutions [e.g., 1 mg/l ($1 \times 10^{-4}$ weight percent)]. Substantially all the polymer in the volume of solution in contact with the metal surface is deposited.

Pretreatment of the metal surface may be important to remove grease and other contamination. When particular emphasis is placed on the highest and most uniform adhesion between the polymer film and the metal surface, the latter may also be abraded with suitable fine abrasive papers or grits.

Copolymers of the invention when applied to metal surfaces have shown much increased adhesion to the metal surface compared with polymers not containing pendent chelating groups. Shear strength improvements of 300 percent have been found.

Improved adhesion is thought to result from chemical reaction of the pendent chelating agents on the polymer with metal ions at the surface of the metal resulting in the formation of covalent bonds between the polymer and the metal. These bonds are formed rapidly, and are stable towards hydrolysis.

The composite structures of the present ivnention are useful in varied applications including the following:

(a) as a highly adhesive thin layer providing protection of metal against corrosion (b) as a priming layer with enhanced adhesive properties for subsequent lacquer or paint application (c) as a highly adhesive layer showing release properties at its exposed surface, e.g., for contaminants or corrosive materials (d) as layers widely ranging in physical properties, e.g., as hard brittle layers to tough flexible layers (depending on the copolymer chosen).

In the Examples below:

Coating samples were normally tested with the cross-hatch tape test (ASTM D-3359-74). However, in some cases shear strengths were measured between two metal samples using the polymers as the adhesive. An Instron brand tensiometer, Model 1026 (Instron Ltd., England) was used to measure the shear strengths.

Adhesion test were conducted using lacquer-type coatings of methyl methacrylate/butylacrylate copolymers containing 0 to 10 mole percent pendent chelating groups. Five different chelating groups were examined, and in each case the presence of the chelating group led to significant improvements in adhesion. The groups involved were salicylic aicd, salicylaldehyde, salicylidene-aniline, 8-hydroxyquinoline and 2-(2-pyriydyl)-benzimidazole. Adhesion of the coatings was monitored by cross-hatch tape tests.

Polymerizable chelating groups were incorporated in a 100 percent solids, cross-linking acrylic adhesive formulation. The resulting adhesive was used to form lap-joints between steel strips and the shear strengths recorded. Two of the chelating monomers gave approximately 80 percent improvement over controls.

Primed metal surfaces were obtained by exhaustion of chelating polymers from solution on the metal surfaces. The chelating polymer was *not* applied to the metal surface as a lacquer-type coating, but was allowed to chemically adsorb onto the metal surface from solution, any loosely bound material being removed by rinsing. The result was an ultra-thin coating tightly bound to the metal surface by chemical bonds.

Increased corrosion protection was found with metals such as steel, copper, brass, and aluminum when coatings of chelating polymers of the invention were applied either alone or as a primer for a paint or lacquer.

Steel panels were primed by the adsorption technique, then coated with a methylmethacrylate-butylacrylate copolymer. These panels showed improved resistance to atmospheric weathering compared to un-primed panels coated with the same polymer.

The six novel monomers (illustrated earlier by structures 1) to 6) were synthesized as follows:

EXAMPLE 1

5-(Methacryloyloxyethoxymethyl)-8-hydroxyquinoline (compound 1 above)

5-Chloromethyl-8-hydroxyquinoline (46 g) (prepared by the method of Kolobielski, *J. Heterocyclic Chem.* 275, (1966)), sodium acetate (16.4 g) and hydroxyethyl methacrylate (200 ml) were stirred and heated on a steam bath for 5 hours, and the resulting slurry was dissolved in water (1 liter). Solid sodium carbonate was added until alkaline, and then the precipitate was collected, washed with water, dissolved in ether (500 ml), dried with $MgSO_4$, and then treated with HCl gas to precipitate the hydrochloride salt. The latter was collected, washed with ether, air dried, dissolved in water (1 liter), and treated with solid sodium carbonate until alkaline. The resulting precipitate was collected, washed with water, dried, and crystallized from light petroleum (b.p. 60°–80° C.) to give 23 g colorless needles, m.p. 90°–1° C.

Spectroscopic analysis confirmed the identity of the product to be the compound 5-(methacryloyloxyethoxymethyl)-8-hydroquinoline.

EXAMPLE 2

5-(Methacryloyloxymethyl) salicylaldehyde (compound 2 above)

5-Chloromethylsalicylaldehyde (34 g) (prepared by the method of Angyal et al., *J. Chem. Soc.* 2141, (1950)) was added to a stirred mixture of acetone (250 ml), sodium hydrogen carbonate (33.6 g), and methacrylic acid (34.4 g) and the mixture was stirred under reflux for 2½ hours. Addition of the mixture to ice water gave a grey precipitate which was collected, washed with water, dried, and crystallized from light petroleum (b.p. 60°–80° C.). Yield 32.1 g, m.p. 82–4.

Elemental and spectroscopic analysis confirmed the product to be the compound 5-(methacroyloxymethyl)-salicylaldehyde.

EXAMPLE 3

5-(Methacryloyloxymethyl) salicylideneaniline (compound 3 above)

The compound of Formula (2) (19.35 g), aniline (8.19 g), and toluene (200 ml) were refluxed with azeotropic removal of water for 2½ hours. The cooled solution was evaporated under reduced pressure, and the residual oil adsorbed on silica gel (90 g). The mixture was extracted at room temperature with successive portions of light petroleum until no more color was extracted.

Evaporation of the combined extracts left a yellow oil which slowly solidified on storage in the refrigerator. It gave identical spectra to a sample of the crude product which was purified by column chromatography on silica gel (eluant ether/light petroleum 1:1).

Spectroscopic analysis confirmed the product as the compound 5-(methacryloyloxymethyl)salicylideneaniline.

EXAMPLE 4

1-(Methacryloyloxyethyoxycarbonylmethyl)-2-(2'-pyridyl)benzimidazole (compound 4 above)

2-(2-Pyridyl)benzimidazole (11.7 g) in N,N-dimethyl formamide (150 ml) was treated with sodium hydride (3.9 g, 50 percent dispersion), with stirring and ice-bath cooling. After effervescence had subsided, chloroacetoxyethyl methacrylate (15 g) (prepared as in Chem. Abs. 68, 105913 g) was added and the temperature was then raised to 70° C. for one hour. After cooling, addition of the mixture to ice water produced a viscous oil which was extracted into ether and isolated by evaporation. The crude product was dissolved in 2N HCl, then extracted with ether (2×100 ml) (extracts discarded), and then aqueous layer was made alkaline with 2N NaOH, and then the product was re-extracted with ether (3×100 ml). Evaporation of the washed ($H_2O$) and dried ($MgSO_4$) ether layers left a brown, viscous gum.

An analytical sample was chromatographed on a column of neutral alumina (eluent ether), while the bulk was slurried with 35 g alumina in 200 ml ether, filtered, the residue washed well with ether, and the ether solution evaporated, to give a colorless gum, which solidified slowly on storage in the refrigerator.

Elemental and spectroscopic analysis confirmed the product to be the compound 1-(methacryloyloxyethyoxycarbonylmethyl)2-(2'-pyridyl)-benzimidazole.

EXAMPLE 5

4-Acryloyloxysalicylic Acid (compound 5 above)

2,4-Dihydroxybenzoic acid (77 g), sodium hydroxide (20 g) and sodium tetraborate (68 g) were dissolved in water (200 ml), then treated further with 20 g sodium hydroxide in water (200 ml). The resulting dark solution was stirred vigorously and the temperature was maintained at 20°–25° C. while acryloyl chloride (50 ml) was added dropwise. After one hour's stirring at room temperature, acidification with concentrated HCl gave a white precipitate, which was collected, washed with water, and dried in vacuo. Crystallization from either dilute acetic acid or acetone/toluene gave a buff powder, m.p. 141°–3° C. Yield 34 g. The product gave a purple color with $FeCl_3$, indicating the salicylic acid function to be intact. Spectroscopic analysis confirmed the product to be the compound 4-acryloyloxysalicylic acid.

EXAMPLE 6

3-(Methacryloyloxyprop-2'-oxycarbonylmethyl)pentane-2,4-dione (compound 6 above)

Chloroacetoxypropyl methacrylate (CAPM) was prepared by condensation of chloroacetyl chloride with hydroxypropyl methacrylate in pyridine (cf Chem. Abs. 68, 105913 g) b.p. 92°–4° C./0.2 mm.

CAPM (44 g), acetylacetone (40 g), anhydrous $K_2CO_3$ (32 g), and acetone (200 ml) were stirred under reflux for 19 hours. The cooled mixture was filtered, the residue was washed well with acetone, and the combined filtrate and washings were evaporated under reduced pressure. Distillation of the residual oil gave a fore-run of unreacted starting materials, followed by 27.9 g product, b.p. 130°–2° C./0.1 mm.

Spectroscopic analysis confirmed the product to be the compound 3-(methacryloyloxyprop-2'-oxycarbonylmethyl)pentane-2,4-dione, monomer is described in EXAMPLE 13 to give a novel polymer.

The above-described novel monomers were copolymerized as described in Examples 7-12. Copolymerization of a known chelating monomer to give a novel polymer is described in Example 13.

EXAMPLES 7-12

Emulsion copolymers of compounds (1)-(6)

The desired amount of chelating monomer (see EXAMPLE 16 for relative amounts used) was dissolved in 30 g of a 4:1 (v/v) mixture of methyl methacrylate and butyl acrylate, and this solution was added to 70 ml 4 percent (w/v) sodium lauryl sulphate solution containing 0.03 g potassium persulphate. This mixture was stirred 1 hour at room temperature under $N_2$, and then it was stirred two hours at 70° C. under $N_2$. The polymer was coagulated by pouring into methanol, collected, dissolved in acetone, re-precipitated with methanol, and dried at 45° C. under reduced pressure. Data relating to the chelating polymers is shown in TABLE I of EXAMPLE 16.

EXAMPLE 13

Copolymerization of a known chelating monomer with acrylic monomers gave a novel polymer 4-Acrylamidosalicylic acid was prepared by the method of Kennedy et al., J. Chem. Soc. Perkin I 488 (1973). A basic solution of the sodium salt of 4-aminosalicylic acid is stirred vigorously at room temperature during the slow addition of a molar equivalent of acryloylchloride. After an additional one hour of stirring, the solution is cooled and slowly acidified with HCl until the pH was below 3. The solid was filtered, washed and recrystallized from 3:1 ethanol/water, m.p. 227°–229° C. Elemental and spectroscopic analyses proved the identity and purity of the product. This compound (5 g) was refluxed 30 min. with 45 ml hexamethyl-disilazane and 1 drop concentrated $H_2SO_4$. The cooled solution was diluted with toluene (75 ml), treated with triethylamine (1.3 g) and trimethylsilyl chloride (1.35 g), and then it was left overnight at room temperature. Filtration, followed by evaporation of the solvents gave the bis(trimethylsilyl) derivative of (5) as a brown oil.

The latter was mixed with methyl methacrylate/butyl acrylate mixture (MMA-co-BA) (4:1 v/v) (23 g) and diluted 1:1 with toluene. Azo-bis-isobutyronitrile (10 mg) was added, the solution flushed out with $N_2$, then heated 5 hours on the steam bath under $N_2$. The product was precipitated with methanol, re-dissolved in acetone, treated with a few ml 2N HCl to ensure hydrolysis of the trimethylsilyl groups, reprecipitated with methanol, and then it was collected and dried at 45° C. under reduced pressure.

EXAMPLE 14

4-Methacrylamidosalicylic acid was prepared according to the method of EXAMPLE 13 except that methacryloylchloride was utilized as a starting material. The recrystallized solid had an m.p. of 238° C. Elemental and spectroscopic analyses proved the identity and purity of the product.

The chelating monomer so produced was homopolymerized in tetrahydrofuran (THF). THF (75 g) was charged with the monomer and 0.5 weight percent initiator azo-bis-isobutyronitrile (AIBN), then flushed with $N_2$, sealed, and then heated with agitation at 65° C. for 16 hours.

The polymer obtained by this process was found to have an average molecular weight of 54,000. It reacted with $FeCl_3$ to give a purple color which indicated that the salicylic acid remained intact.

The chelating monomer was also polymerized with hydrocarbon and fluorocarbon monomers (see Example 22) in the manner as above. The resulting polymers were found to have average molecular weights in the 66,000 to 300,000 range.

EXAMPLE 15

Homopolymerization of the chelating monomers of EXAMPLES 1-6 were carried out. Only compound (1) failed to give any polymer, while compound (3) gave only low molecular weight, non-film-forming material; compounds of (2), (4), and (5) were successfully polymerized in solution, and compound (6), being a liquid, gave an emulsion polymer.

EXAMPLE 16

Analysis of the Chelating Polymers

Incorporation of the chelating groups in the polymer was monitored by UV spectrometry. Each of the monomers (1) to (6) showed a characteristic, intense absorption in the wavelength range 280 to 350 nm, in which the methyl methacrylate/butyl acrylate copolymer was transparent. The UV spectra of the product polymers were therefore used to give both a qualitative and quantitative measure of the incorporation of the chelating groups, and this was found to match closely their incorporation in the monomer feed (Table 1). In addition, $^{13}C$ NMR spectra were recorded for copolymers containing compounds (1) and (3). These clearly showed the signals associated with the aromatic carbons in the chelating groups.

TABLE 1

| Monomer | Mole % in Feed | Mole % in Polymer |
| --- | --- | --- |
| (1) | 1.0 | 1.4 |
|  | 3.0 | 4.4 |
|  | 5.0 | 7.2 |
|  | 7.5 | 9.5 |
|  | 10.0 | 15.5 |
|  | *30.0 | 30.7 |
| (2) | 1.0 | no data |
|  | 3.0 | 4.0 |
|  | 5.0 | 6.8 |
| (3) | 1.0 | 0.8 |
|  | 3.0 | 2.3 |
|  | 5.0 | 11.4 |
| (4) | 1.0 | 1.4 |
|  | 3.0 | 2.9 |
|  | 5.0 | 3.1 |
| (5) | 1.0 | 2.4 |
|  | 3.0 | 3.3 |
|  | 5.0 | 5.1 |
|  | 7.5 | 6.6 |
|  | 10.0 | 9.5 |
| (6) | 1.0 | 1.2 |
|  | 3.0 | 2.7 |
|  | 5.0 | 7.5 |
|  | 7.5 | 6.0 |
|  | 10.0 | 8.6 |
|  | 15.0 | 26.2 |

*solution polymer

The following examples illustrate the improved adhesion to mild steel panels of lacquer-type coatings.

EXAMPLE 17

Metal surface preparation

Mild steel sheet (20 gauge) was subjected to a degrease-abrade-degrease routine immediately before use. After wiping with acetone-soaked tissue, it was abraded with Scotch ™ brand (3M) fine-grade discs in a hand-held rotary sander, then hand-finished with 400 grit paper. The final step was degreasing in a trichloroethylene vapor bath.

Coatings

Coatings were made on the prepared steel sheet from 6 percent w/v solutions of polymer in acetone or chloroform. A variety of techniques were used, including wire wound bars, blade and flood-coating, giving thicknesses in the range of 2 to 10 micrometers. Coating thickness was monitored by an Elcometer 150N eddy current tester (Elcometer Instruments Ltd., Manchester, England).

Adhesion to Metals

Coatings of copolymers of EXAMPLES 7-12 were tested with chelating group incorporations (nominal) of 1, 3 and 5 mole percent. Adhesion of the coatings was monitored by a cross-hatch tape test (ASTM D3359-74). Whereas, the reference copolymer of MMA and BA failed this test completely, all the chelating polymers examined passed undamaged, showing that substantial improvements in adhesion were provided by this technique. Even when a tape of double the specified peel strength was used, the coatings still survived intact.

A more severe test method was applied to similar samples (Federal Test Method Std. No. 141B, Method 6301) by scribing two parallel lines 2.54 cm apart, applying the tape to the area between them, and inspecting the coating on removal of the tape. Results are given in TABLE 2.

TABLE 2

| Chelating monomer | % Incorporation (nominal) | Damage |
| --- | --- | --- |
| None | — | very severe |
| Methacrylic acid | 5 | very severe |
| as in Example 13 | 3 | none |
| (1) | 3 | very slight |
| (1) | 5 | none |
| (2) | 3 | severe |
| (2) | 5 | very slight |
| (3) | 3 | severe |
| (3) | 5 | none |
| (4) | 3 | slight |
| (4) | 5 | very slight |

These results showed that the chelating groups offered a distinct advantage, which correlated with the amount present, and indicated salicylic acid to be the most effective. It was also significant that methacrylic acid, a non-chelating polar monomer, offered no advantage.

EXAMPLE 18

An evaluation of a resin of the invention cured under pressure was conducted. Lap joints were made between steel strips, and the shear strengths recorded. The steel strips were prepared as in EXAMPLE 17 and an Instron brand tensiometer was used to measure the shear strengths.

Using the formulation listed below, and an overlap area of 18 mm × 18 mm, lap shear strengths of approx. 50 kg were obtained, with a reproducibility of approximately 10 percent.

| | | |
|---|---|---|
| Poly(MMA) in MMA (4 percent w/w) | 4 | parts |
| Tetraethyleneglycol dimethacrylate | 6 | parts |
| Benzoyl peroxide | 0.1 | part |
| N,N—dimethylaniline | 0.1 | part |

Chelating groups were introduced by replacing 10 weight percent of the MMA with chelating monomer, giving the results listed in Table 3.

TABLE 3

| Chelating Monomer | Shear Strength (kg) |
|---|---|
| (5) | 91 |
| (1) | 94 |
| (2) | 64 |
| (4) | 47 |
| none | 50 |

Thus, it was established that chelating monomers could provide significant improvements in adhesive strength for 100 percent solids systems, with salicylic acids and 8-hydroxyquinoline showing the greatest effect. However, the concentration of chelating groups could not be varied over a wide range because of the limited solubility of the chelating monomers in methyl methacrylate.

EXAMPLE 19

In order to avoid confusion between the cohesive strength of the chelating polymer and its adhesive strength at the interface with the metal, application of the polymer was made by chemical adsorption from dilute solution.

A holder was built which allowed 12 strips of steel (80 mm × 18 mm) to be rotated slowly (approx. 50 r.p.m.) with their ends dipping in a solution (or solvent) to a depth of 20 mm. Conditions were standardized as one hour's dip in a 1 percent by weight solution of polymer in acetone, followed by 30 minutes rinse in fresh solvent. With the copolymers of monomer 6, chloroform was substituted for acetone. In some experiments as noted below, the rinse was followed by vapor degreasing.

Lap joints were made with the adhesive described in Example 18 (overlap 18 mm), bound with adhesive tape, and they were allowed to cure overnight at room temperature under pressure. Prior to measuring the shear strength on an Instron apparatus, the tape was removed and the dimensions of the joint checked for deviations from the target of 18 mm × 18 mm, with adjustments being made accordingly to the recorded strengths. The average of six specimens was taken for each treatment.

A survey of the monomers (1) to (6), copolymerized with MMA to a nominal 5 mole percent incorporation showed that the most effective groups in this context were derived from monomers (1) and (5), although all showed significant improvements over untreated metal. A slight improvement was also noted when the control polymer poly (MMA-co-BA) of EXAMPLE 13 was used in place of chelating polymer, but this effect disappeared when the treated strips were put in the vapor degreasing bath prior to lap-joining. Vapor degreasing had no effect on the strips treated with chelating polymer.

A closer study was carried out on the most effective groups, those derived from monomers (1) and (5), with emphasis on the effect of varying the concentration of chelating groups in the adsorbed polymer. The results are given in Table 4.

TABLE 4

| Chelating Monomer | Mole % Incorporation* | Shear Strength (Kg) |
|---|---|---|
| (5) | 0 | 50 |
| | 2.4 | 87.5 |
| | 3.3 | 107 |
| | 5.1 | 142 |
| | 6.6 | 123 |
| | 9.5 | 142 |
| | 100 | 53 |
| (1) | 0 | 50 |
| | 1.4 | 94 |
| | 4.4 | 95 |
| | 7.2 | 128 |
| | 9.5 | 125 |
| | 15.5 | 124 |
| | 30.7 | 49 |

*Calculated from UV absorption.

There was an obvious trend for the shear strength to increase sharply with increasing content of chelating group, with the maximum being reached in the range of 5 to 10 mole percent, and the adhesion promotion disappearing at high concentrations. A 15 mole percent copolymer of monomer (5) with MMA was prepared, but it could not be redissolved in acetone, chloroform, etc. after drying. Intermolecular hydrogen bonding was probably to blame, as the polymer dissolved when tetrabutylammonium hydroxide was added. However, salt formation in this way destroyed the chelating effect towards steel surfaces.

These results suggest that there is an optimum concentration of chelating groups on the adsorbed polymer which combines effective bonding to the metal surface with the existence of unbound "loops" and "tails" which can interpenetrate and entangle with the applied adhesive of Example 18. Greater concentrations of chelating groups result in the disappearance of such loops and tails, and, in the case of polar groups such as salicylic acid and 8-hydroxyquinoline, give a surface that is less compatible with the relatively non-polar adhesive. Another means by which a high content of chelating groups could lead to poor adhesion is by solubilizing the surface layer of metal, which could happen when more than one chelating group reacted with the same metal ion. This explanation seems less likely, however, as most of the polymers in question showed good adhesion when applied as lacquers. Only the homopolymer of (5) showed any tendency to give a characteristic color when coated on steel, and then flaked off easily, but even so, the process required exposure to moisture before it occurred to any great extent.

The first explanation predicts that a less polar chelating group should give a less drastic fall-off in adhesion at high incorporations, when subjected to the adsorption-lap shear test. Although all chelating groups must be polar to some extent, it seems reasonable that the β-diketone derivative (6) could be more compatible with acrylates.

The results (Table 5) do indeed show that the high incorporation copolymers of (6) give better adhesion than the corresponding polymers of (1) and (5) (see Table 4). All the results point to an optimum level of incorporation in the range of 5 to 10 mole percent.

TABLE 5

| Mole % Incorporation | Shear Strength (Kg) |
| --- | --- |
| 0 | 50 |
| 1.2 | 76 |
| 2.7 | 80 |
| 6.0 | 97 |
| 7.5 | 68 |
| 8.6 | 57 |
| 26.2 | 79 |
| 100 | 77 |

EXAMPLE 20

A typical phosphate anticorrosion treatment was applied to the steel strips for comparison purposes. The phosphating solution was taken from the recent literature, Eur. Appl. 19,430 (
Chem. Abs. 94, 144059), and consisted of $ZnCl_2$ (2.5 g), $NaClO_3$ (2.6 g), $NaNO_2$ (0.15 g), $NaBF_4$ (0.5 g), and $H_3PO_4$ (17.2 g) made up to one liter with distilled water. Test strips were dipped in this solution for 30 minutes at room temperature, rinsed in distilled water, then in acetone, and allowed to dry before lap-jointing. Longer or shorter dip times were found to be much less effective.

The best results obtained (approx. 200 kg) were generally better than the best chelating polymer results (142 kg). However, a combination of the two (phosphate followed by chelating polymer) was even better (250 kg).

EXAMPLE 21

The trend shown in EXAMPLE 20 of enhancement of phosphate protection was borne out by atmospheric weathering experiments on steel panels given the various treatments. On its own, none of the treatments afforded significant corrosion protection, but when top coated with an acrylic lacquer, all showed improvement over bare metal coated with the lacquer. The chelating polymer performed slightly better than the phosphate, but the combination of the two was best of all.

Atmospheric weathering tests

Six steel panels were prepared as follows:
(A) 30 min. dip in phosphate solution
(B) 1 hour dip in 1 weight percent chelating polymer solution (5 mole percent copolymer of (2))
(C) as (A), overcoated with lacquer
(D) as (B), overcoated with lacquer
(E) 30 min. phosphate dip one hour chelating polymer dip
(F) as (E), overcoated with lacquer.

The lacquer consisted of poly (MMA-co-BA) (4:1), 6 weight percent in chloroform solution, giving a coating thickness of approximately 5 micrometers.

Atmospheric weathering was carried out on the laboratory roof. Panels (A), (B) and (E) showed little or no improvement over bare metal, but (C), (D) and (F) showed considerable improvement. After 3 months exposure, (C) had about 50 percent of the coating intact, while (D) and (F) had the coatings almost completely intact, but with discoloration occurring underneath, ((F) less so than (D)).

EXAMPLE 22

The application of chelating polymers according to this invention has been shown to give high protection to aluminum surfaces. It has shown the most advantageous improvements when used with treatments disclosed in the prior art. Thus, in this example it was combined with a pretreatment of the aluminum to give AlOOH (see U.S. Pat. No. 4,149,912) and the chelate polymer coating was followed with a latex or lacquer paint coat.

Aluminum used for testing was standard 3003 aluminum obtained from the Q-panel Company (Cleveland, OH) which also supplied Alodine ® treated aluminum panels used as comparisons.

The aluminum metal surfaces to be tested are cleaned in the conventional manner. For this example the surfaces were cleaned at 70° C. for one minute with a non-etching cleaner comprising 30 g/l of sodium pyrophosphate, 4 g/l of sodium gluconate, and 1 g/l of a wetting agent.

The aluminum surface was then converted to AlOOH by treatment in a sodium hydroxide mist followed immediately by treatment in a steam chamber and finally a cold water rinse.

The chelating polymers were coated onto these metal surfaces by dip coating into 0.1 to 3 percent solutions, removing and air drying; there was no need for more concentrated solutions, high temperatures, or long reaction times. (Coatings may also be made from aqueous solutions, depending on the chelate and polymers used.)

These samples were then coated with a white lacquer or with a latex topcoat obtained from Alcoa. Coatings of the lacquers and latex topcoats with a No. 30 wire wound bar followed by immediate curing at 240° C. for 2 minutes as directed by Alcoa.

All samples were tested for paint adhesion via the cross cut tape test of ASTM D3359-78 and an impact bend test.

Samples were evaluated for corrosion resistance by providing 50.8 cm (20 inches) of freshly cut edges and placing in a salt acetic acid fog similar to ASTM-B117-73 and were rated by the number and size of paint blisters according to ASTM-D714-56. Results are given in Table 6.

Comparisons were made with Alodine ® treated aluminum as received from the supplier and, with plain aluminum, aluminum treated to give AlOOH only, and aluminum coated with a chromate primer and latex using a No. 10 wire wound bar and cured at 240° C. for 30 seconds.

TABLE 6

| | Composition (wt %) | | | Test Results | | |
| --- | --- | --- | --- | --- | --- | --- |
| Polymer | MeFOSEMA* | ODMA* | AC-SAL* | latex and chromate primer | latex | lacquer |
| 1 | 0 | 0 | 100 | 9#6,16#8 | 13#8 | 8#8 (best) |
| 2 | 0 | 97 | 3 | — | 14#6,15#8 | — |
| 3 | 19 | 78 | 3 | — | — | 15#6 |
| 4 | 39 | 58 | 3 | — | 14#6,20#8 | 32#8 |
| 5 | 58 | 39 | 3 | — | 32#6 | 22#6 |
| Alodine ® | — | — | — | 6#6,10#8 | — | 10#6 |
| AlOOH only | — | — | — | 10#6,18#8 | 20#6 | 4#4,17#6 |

TABLE 6-continued

| | Composition (wt %) | | | Test Results | | |
|---|---|---|---|---|---|---|
| Polymer | MeFOSEMA* | ODMA* | AC-SAL* | latex and chromate primer | latex | lacquer |
| Al only | — | — | | 2#1,7#4 | 5#4,12#8 | 10#2,6#4 |

*MeFOSEMA - n-methylperfluorooctylsulfonylamidoethylmethacrylate
ODMA - octadecylmethacrylate
AC-SAL - 4-methacrylamidosalicylic acid (see Example 15)
**These results are given in accordance with ASTM-D714-56. They involve two numbers, the first representing the number of paint blisters occurring and the second rating their size with large numbers indicating smaller size.

The data of TABLE 6 show that the best protection was obtained when using the AlOOH/homopolymer AC-SAL/lacquer topcoat construction. This surpasses even the standard chromate treatment of the prior art (Alodine).

Various modifications and alterations of this invention will become apparent to those skilled in the art without departing from the scope and spirit of this invention, and it should be understood that this invention is not to be unduly limited to the illustrative embodiments set forth herein.

I claim:

1. A composite structure comprising a metal surface of polyvalent metal atoms and ions, said metal surface comprising a metal chosen from the group consisting of (a) transition metals, (b) metals of Groups IIA, IIIA, and IVA of the Periodic Table, and (c) alloys of metals selected from (a) and (b), and applied thereto at least one linear, film-forming polymer or random copolymer having a hydrocarbon backbone, said polymer or copolymer having 99.99 to 0 mole percent of units derived from one or more ethylenically-unsaturated monomers, and between 0.01 and 100 mole percent of at least one monomer unit which contributes to the polymer or copolymer pendent bidentate chelating groups, said bidentate chelating monomer units having the formula

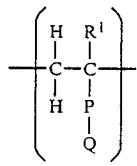

in which
R$^1$ is hydrogen, lower alkyl (1 to 4 carbon atoms), chlorinated lower alkyl, CN, or Cl
P is a connecting linkage of chain length up to about 75 atoms, and providing that P does not react with Q, nor enter into any chelating action with Q, nor has polymerizing units within it, and
Q is a bidentate chelating moiety chosen from groups having a high affinity for the polyvalent metal ion defined above, and the solvating ability of the bidentate group for the metal surface is given by the expression log K$_1$+n(14−pH)−(pKs+pKa) is algebraically less than 0.0, wherein
K$_1$ is the first stepwise stability constant of the chelate and metal,
n is the relevant valency of the metal,
pH is the acidity relevant under the conditions of test,
pKs is the solubility product of the metal hydroxide, and
pKa is the stability constant of H+ with the chelate moiety.

2. The composite structure according to claim 1 wherein said copolymer comprises 3 to 20 mole percent of said chelating monomer units.

3. The composite structure according to claim 1 wherein said metal surface and said bidentate chelating group form a complex compound with a first step-wise stability constant greater than 10$^7$.

4. The composite structure according to claim 1 wherein said polymer or copolymer has a molecular weight in the range of 5,000 to 1,000,000.

5. The composite structure according to claim 1 wherein said metal surface is selected from (a) the surface on a self-supporting metal, (b) a thin metal layer on a support, and (c) small particles of metal.

6. The composite structure according to claim 1 wherein:
P is a connecting linkage of 1 to 6 moieties selected from the group consisting of a single bond, —O—, —S—,

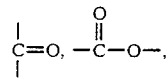

—SO$_2$—, a methylene chain up to 22 carbon atoms long optionally substituted with up to 11 lower alkyl groups, —NR$^2$— wherein R$^2$ is H or lower alkyl,

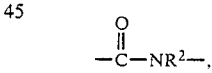

—SiR$^2$R$^3$— wherein R$^3$ is H or lower alkyl independently of R$^2$, phenylene, phenylene substituted with lower alkyl, naphthylene, naphthylene substituted lower alkyl, 5- or 6-membered heterocyclic rings containing up to three hetero atoms selected from N, S, O, and a combination of any such groups.

7. The composite structure according to claim 6 wherein the said one or more chelating monomer units are derived from monomers selected from the group consisting of

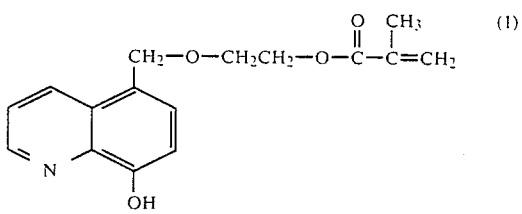

-continued

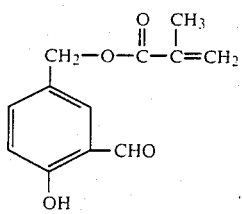
(2)

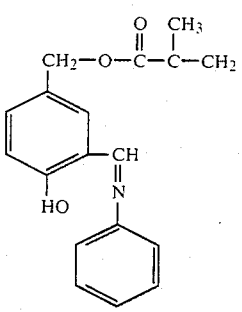
(3)

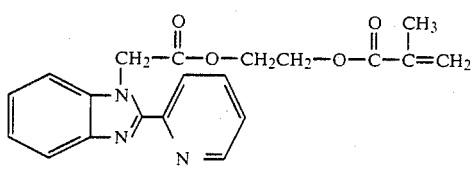
(4)

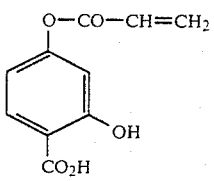
(5)

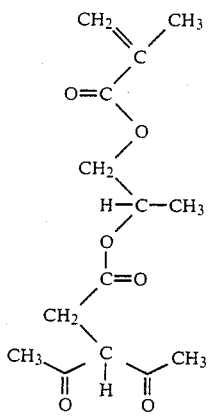
(6)

8. The composite structure according to claim 6 wherein said polymer consists essentially of units of said chelating monomer.

9. The composite structure according to claim 6 wherein said polymer is a copolymer with at least one non-chelating ethylenically-unsaturated monomer.

10. A method of providing a composite structure having a highly adherent polymeric coating, comprising the steps:

(a) providing a metal surface of polyvalent metal atoms and ions wherein said metal surface comprises a metal chosen from the group consisting of (a) transition metals, (b) metals of Groups IIA, IIIA, and IVA of the Periodic Table, and (c) alloys of metals selected from (a) and (b), (b) coating said metal surface with a film-forming polymer or random copolymer as a 100 percent solids formulation or from solution or suspension in inert solvent, said polymer or copolymer having a hydrocarbon backbone and having 99.99 to 0 mole percent of units derived from one or more ethylenically-unsaturated monomers, and between 0.01 and 100 mole percent of at least one monomer which contributes to the polymer or copolymer pendent bidentate chelating groups whose chelating ability is less than that required for dissolution of metal ions from said metal surface, said bidentate chelating monomer units having the formula

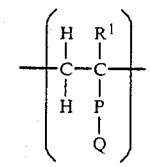

wherein
$R^1$ = H, lower alkyl, chlorinated lower alkyl, CN, or Cl,
P is a connecting linkage of chain length up to about 75 atoms providing that P does not react with Q, nor enter into any chelating action with Q, nor has polymerizing units with it; and
Q is a bidentate chelating moiety chosen from groups having a high affinity for the polyvalent metal ion defined above, and the solvating ability of the bidentate group for the metal surface given by the expression $$\log K_1 + n(14-pH) - (pKs + pKa)$$

is algebraically less than 0.0 wherein
$K_1$ is the first stepwise stability constant of the chelate and metal,
n is the relevant valency of the metal,
pH is the acidity relevant under the conditions of test,
pKs is the solubility product of the metal hydroxide, and
pKa is the stability constant of $H^+$ with the chelate moiety, (c) drying said coated metal surface.

11. The method according to claim 10 wherein said polymer in said coating step is present in a solution with an inert solvent at a concentration in the range of $10^{-4}$ to 3.0 weight percent, and said method further comprises the steps of:

(a) contacting said metal surface with said polymer solution and allowing chemical adsorption of said polymer onto said metal surface to take place, (b) rinsing said chemically adsorbed polymer with said inert solvent, and (c) drying said polymer on said metal surface.

12. The method according to claim 10 wherein P is a connecting linkage of 1 to 6 moieties selected from the group consisting of a single bond, —O—, —S—,

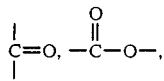

—SO$_2$—, a methylene chain up to 22 carbon atoms long optionally substituted with up to 11 lower alkyl groups, —NR$^2$— wherein R$^2$ is H or lower alkyl,

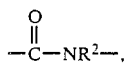

—SiR$^2$R$^3$ wherein R$^3$ is H or lower alkyl independently of R$^2$, phenylene, phenylene substituted with lower alkyl, naphthylene, naphthylene substituted with lower alkyl, 5- or 6-membered heterocyclic rings containing up to three hetero atoms selected from N, S, O, and a combination of any such groups.

13. The method according to claim 12 wherein said copolymer comprises in the range of 3 to 20 mole percent of said chelating monomer units.

* * * * *